July 14, 1931.  F. A. HEIMBOLD  1,814,157
EMERGENCY VALVE
Filed June 22, 1928  2 Sheets-Sheet 1
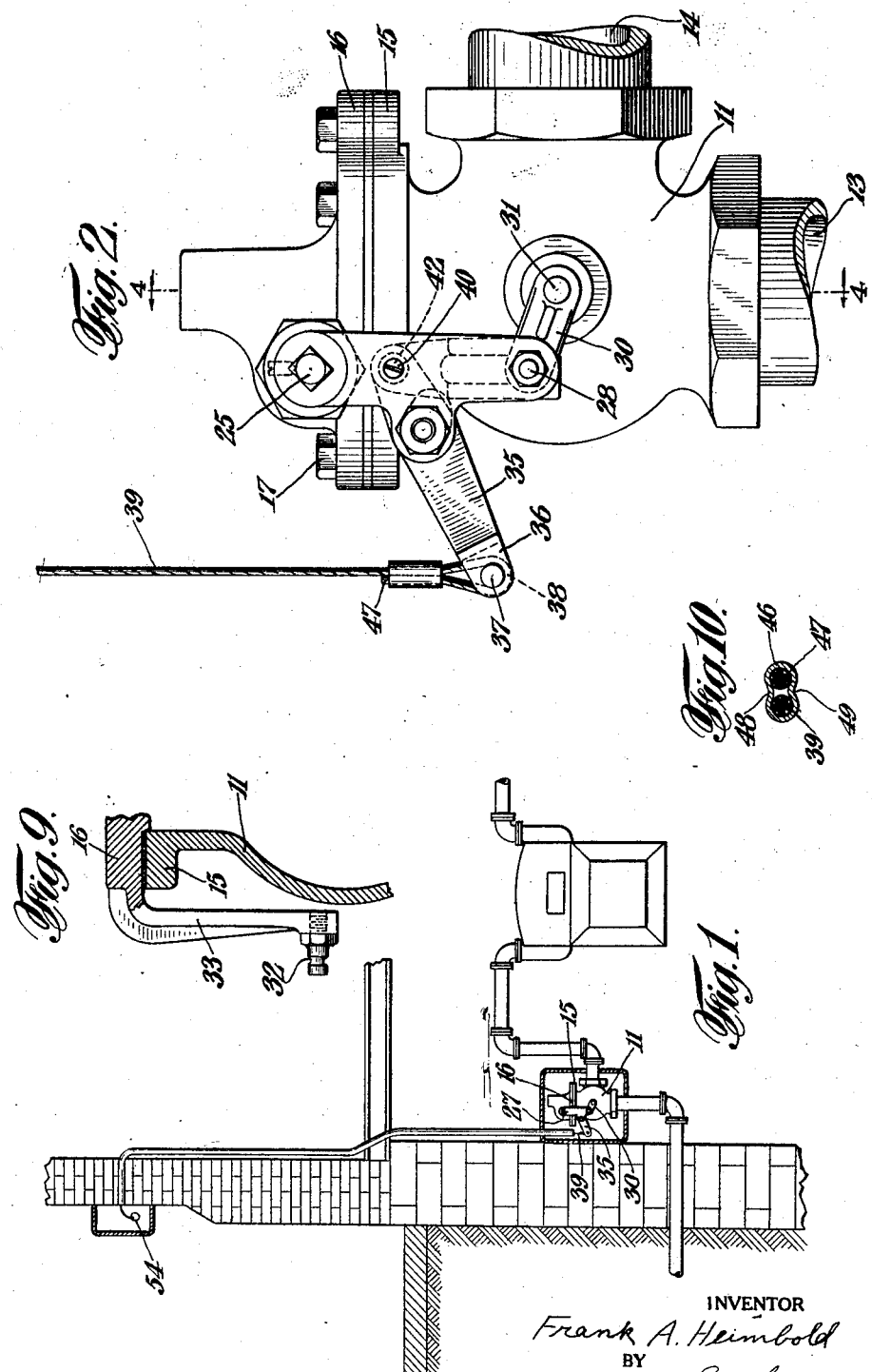
INVENTOR
Frank A. Heimbold
BY
Ward & Crosby
ATTORNEYS July 14, 1931. F. A. HEIMBOLD 1,814,157
EMERGENCY VALVE
Filed June 22, 1928 2 Sheets-Sheet 2
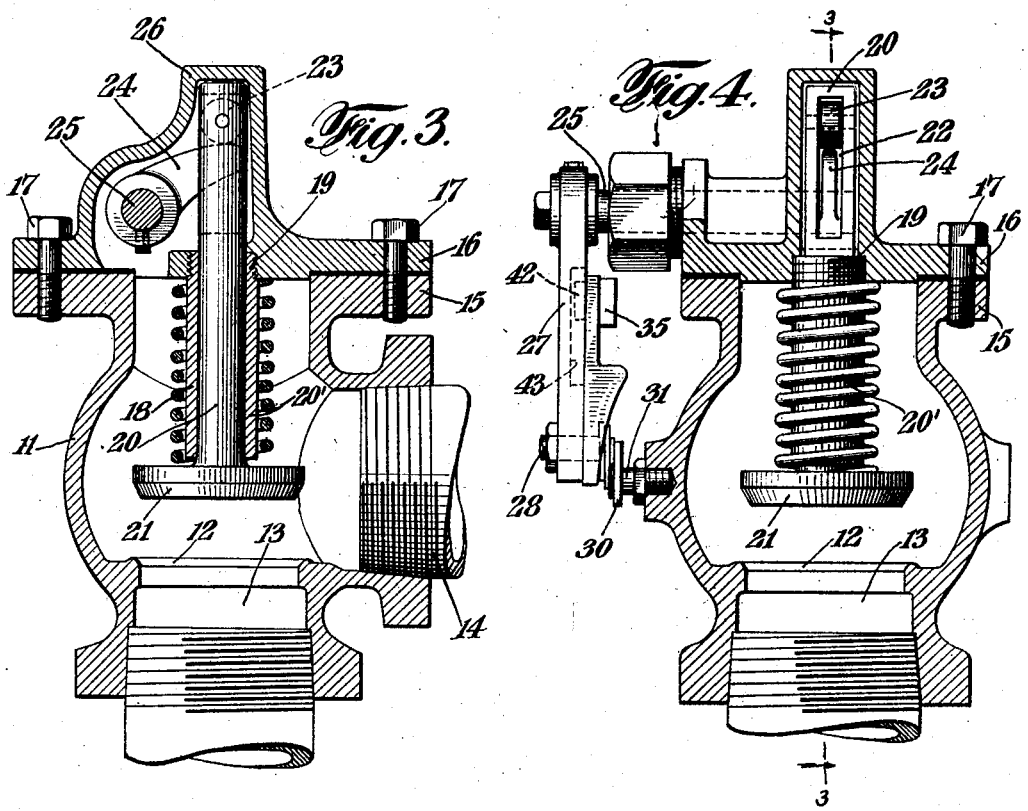
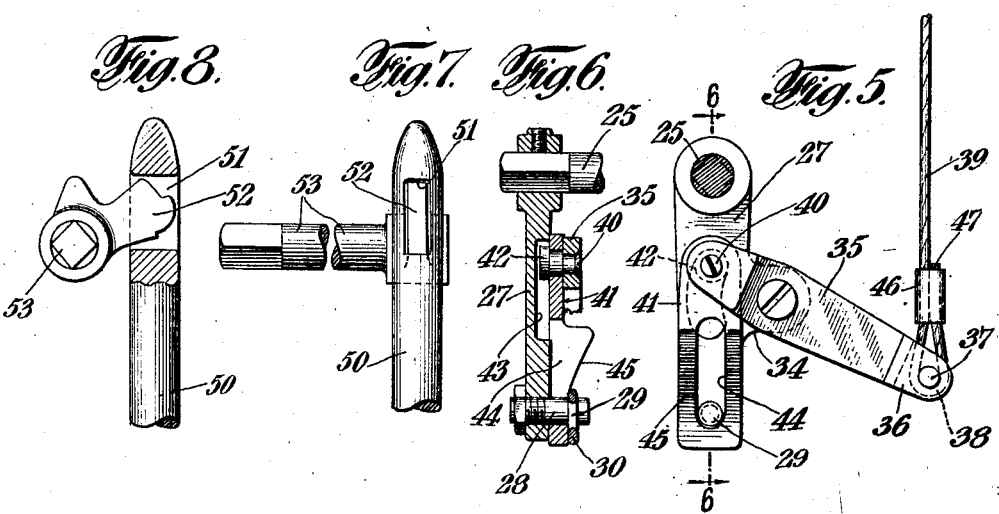
INVENTOR
Frank A. Heimbold
BY
Word & Crosby
ATTORNEY Patented July 14, 1931

1,814,157

UNITED STATES PATENT OFFICE

FRANK A. HEIMBOLD, OF ATLANTIC HIGHLANDS, NEW JERSEY

EMERGENCY VALVE

Application filed June 22, 1928. Serial No. 287,397.

This invention relates to shut-off valves for emergency uses such as in water, steam, gasoline, air, or illuminating gas pipe lines. One phase of the invention particularly relates to valves so constructed and operated that they will not only close when a predetermined temperature is reached in cases of fire, but may at will be closed from one or more points on the inside or outside of a building in which the valve may be located whenever a fire occurs or there is a broken or leaky line.

The objects of the invention include the provision of a simple, compact, and durable valve, and operating mechanism therefor, so constructed and with the various parts so related that the device may be installed or dismantled with a minimum expenditure of time and labor.

Further and more specific objects, features and advantages will more clearly appear from the detailed description given below when taken in connection with the accompanying drawings which form part of the specification and which illustrate certain embodiments of the invention, and in which Fig. 1 is a view partly in section and partly in elevation, and more or less diagrammatically illustrated how my improved valve may be installed;

Fig. 2 is a side elevation of the valve casing and the operating parts;

Fig. 3 is a vertical section taken substantially along the line 3—3 of Fig. 4;

Fig. 4 is a vertical section taken on the line 4—4 of Fig. 2;

Fig. 5 is an elevation of the fusible-link releasing means;

Fig. 6 is a vertical section taken on the line 6—6 of Fig. 5;

Fig. 7 is an elevation of a modified form of valve stem operating means;

Fig. 8 is a view, partly in section, taken substantially at right angles to that of Fig. 7;

Fig. 9 is a partial section showing a modified form of support for the fusible link; and Fig. 10 is a detail section through the cable clamping means.

As illustrated in the drawings, the preferred form of the invention comprises a valve casing 11, having a valve seat 12, and fluid openings 13 and 14. The top of casing 11 is provided with a flat machined flange 15, against which abuts the lower face of a top cap or plate 16. The plate 16 and the flange 15 are provided with symmetrically aligned and arranged bores to receive bolts 17. The flange 15 and the plate 16 with their aligned bores are so related that the top plate can be reversed on the flange and yet have the bores in alignment.

A sleeve 18 is threaded into a bore 19 centrally disposed on the plate 16 and acts as a guide for a valve stem 20 carrying a valve 21 on its lower end adapted normally to rest on the seat 12. A spring 20' surrounds the stem 20 and tends to press the valve 21 on the seat 12. The upper end of the valve stem 20 is provided with a slot 22 in the upper end of which is mounted a roller 23. Projecting into the slot 22 and disposed beneath the roller 23 is a lifting cam arm 24, mounted on a shaft 25. This cam arm 24 and the valve stem 20 are disposed beneath a housing 26 on top of the plate 16. The shaft 25 extends outside the housing 26 and on its outer end carries a downwardly extending arm 27 called the lifting arm. On the lower end of this arm 27 is mounted a pin 28, the outer end of which has a groove 29 therein. This groove 29 is adapted to receive the apertured end of a fusible link 30, the aperture in which is large enough for the link to be slipped over the end of the head on pin 28. The other end of the link 30 is pivotally connected to a headed stem or boss 31 on the side of the casing 11. As shown in Fig. 9, the other end of the link 30 may be connected to a stem or boss 32 on the lower end of an arm 33 dependent from the top plate 16 so that this latter boss can be moved with the top plate 16.

Pivotally mounted on an offset portion 34 of the arm 27 is a lever 35 called the manual releasing means. At one end 36 this arm or lever 35 is forked and has a cross pin 37 to receive the looped end 38 of a flexible connector or cable 39. At the other end this lever 35 has a pin 40 projecting through an aperture in the upper end of a slidable wedge plate 41. The inner end of pin 40 has a head 42 to ride in a curved recess 43 in the arm 27. The lower end of plate 41 has a slot 44 in which link pin 28 is disposed, and the front face 45 of plate 41 is sloped or beveled to act as a wedge.

The looped end 38 of cable 39 is passed through a soft metal sleeve 46 and the free end 47 thereof turned back through the sleeve 46 as shown in Figs. 5 and 10. On opposite sides this sleeve 46 is longitudinally indented as at 48 and 49 along the line between the lengths of cable lying therein. This crimping effect acts to clamp the cable firmly.

In Figs. 7 and 8 the valve stem 50 is provided with an upper slot 51 into which a curved cam arm 52 projects. This arm 52 is mounted on a cam shaft 53 as before.

In the operation of the device the parts are normally set in the position shown in Fig. 2, with the operating and lifting arm 27 engaged by one end of the fusible link 30, which may either be connected to the boss 31 on the side of the casing 11 or to the boss 32 on the lower end of arm 33 dependent from the top plate 16. In this position the valve 21 is held up off the seat 12 against the action of spring 20'. This is accomplished by the engagement between the lifting cam 24 with the roller 23 in the position shown in Fig. 3.

When the temperature in the vicinity of the valve exceeds a predetermined value, the fusible link 30 will melt, thus releasing the arm 27 and permitting the spring 20' to snap the valve onto its seat. If the cause of the emergency is a broken or leaky pipe line, or if for any other reason it is desired to manually release the valve, a ring 54 on the upper end of cable 39 is pulled. Pulling this cable will actuate the manual release lever 35 to force the wedge plate 41 downwardly. This, by reason of its beveled surface 45, will force the end of link 30 off the pin 28, thus releasing the link 30 from the arm 27 and again permitting the valve to be closed. It will be observed that all of the operating parts are supported from the top plate 16 and that they are so arranged and related thereon that this plate can be reversed or turned half way around while still permitting the parts to remain in operative relation. This condition is achieved without the necessity of readjusting the parts, replacing any of them, or substituting additional parts. By reason of this disposition, the device can be used in many places otherwise impossible without substantial readjustment of the device, particularly when it is necessary to run pipe lines close to walls or the ceilings of a building, and to achieve this reversal without any readjustment or substitution of the parts.

The compact, simple relation and cooperation of the elements afford an efficient, smooth action, with a minimum of friction.

The simple clamping sleeve 46 affords a highly efficient, economical means for forming and maintaining a loop in the end of the cable.

While I have described my improvements in detail and with respect to certain preferred forms thereof, I do not desire to be limited to such details or forms, since many changes and modifications may be made and the invention embodied in other forms without departing from the spirit and scope of the invention in its broader aspects. Hence, I desire to cover all modifications and forms coming within the language or scope of any one or more of the appended claims. What I claim is new and desire to secure by Letters Patent is:

1. An emergency shut-off valve device comprising a valve casing having a valve seat, a top plate for said casing, a valve supported from said plate, a valve stem having a slotted end, a roller bearing in said slot, a cam arm projecting into said slot and engaging said bearing and a cam shaft supporting said cam and mounted on said top plate.

2. An emergency shut-off valve device comprising a valve casing having a valve seat, a top plate for said casing, a sleeve dependent from said plate, a valve stem slidable in said sleeve, a housing on said plate, one end of said stem being slotted and extending into said housing, a cam shaft on said plate and projecting into said housing, a cam arm on said shaft projecting into said slot, a valve on said stem, and a spring around said stem tending to move the valve towards its seat.

3. An emergency shut-off valve device comprising a valve casing having a valve seat, a top plate for said casing, a sleeve dependent from said plate, a valve stem slidable in said sleeve, a housing on said plate, one end of said stem being slotted and extending into said housing, a cam shaft on said plate and projecting into said housing, a cam arm on said shaft projecting into said slot, a valve on said stem, and a spring around said stem tending to move the valve towards its seat, all of said elements so disposed on said plate that it can be reversed in position for right or left hand operation without readjustment, replacement, or substitution of any of them thereon.

4. An emergency shut-off valve device comprising a valve casing having a valve seat, a top plate for said casing, a sleeve centrally dependent from said plate, a valve stem slidable in said sleeve, a housing on said plate, one end of said stem being slotted and extending into said housing, a roller bearing in said said slot, a cam shaft on said plate and projecting into said housing, a cam arm on said shaft projecting into said slot, in engagement with said bearing, a valve on said stem, and a spring around said stem tending to move the valve toward its seat.

5. An emergency shut-off valve device comprising a valve casing having a valve seat, a top plate for said casing, a sleeve centrally dependent from said plate, a valve stem slidable in said sleeve, a housing on said plate, one end of said stem being slotted and extending into said housing, a roller bearing in said slot, a cam shaft on said plate and projecting into said housing, a cam arm on said shaft projecting into said slot in engagement with said bearing, a valve on said stem, and a spring around said stem tending to move the valve toward its seat, and releasable means connected to said cam shaft to hold the valve off its seat.

6. An emergency shut-off valve device comprising a valve casing having a valve seat, a top plate for said casing, a sleeve centrally dependent from said plate, a valve stem slidable in said sleeve, a housing on said plate, one end of said stem being slotted and extending into said housing, a roller bearing in said slot, a cam shaft on said plate and projecting into said housing, a cam arm on said shaft projecting into said slot in engagement with said bearing, a valve on said stem, and a spring around said stem tending to move the valve toward its seat, and means connected to said cam shaft to hold the valve off its seat, and temperature responsive means to release said holding means when a predetermined temperature in the vicinity of the device has been achieved.

7. An emergency shut-off valve device having a valve and means tending to hold the valve on its seat, comprising means for holding the valve off its seat, said last mentioned means comprising a cam shaft, a lifting arm thereon, and a fusible link connected to said arm and to a fixed part of the valve device to hold the arm in a predetermined position, a manual release lever on said lifting arm, and a wedge shaped plate operated by said release lever to force the link out of engagement with said lifting arm.

8. An emergency shut-off valve device comprising a valve lifting arm, a pin on one end thereof, a fusible link connected at one end to said pin and connected at the other end to a fixed part of the device, a manual release lever pivoted on said lifting arm, a slotted sliding wedge shaped plate operated by said release lever, said pin riding in said slot, and a wedge face of said plate lying between the lifting arm and the link and adapted when operated to force the link off the pin.

In testimony whereof I have signed my name to this specification.

FRANK A. HEIMBOLD.